(12) United States Patent
Kakutani et al.

(10) Patent No.: US 7,166,981 B2
(45) Date of Patent: Jan. 23, 2007

(54) ACTUATOR, MOTOR UNIT AND CONTROLLER UNIT

(75) Inventors: Kazushige Kakutani, Hirakata (JP); Shinya Kataoka, Hirakata (JP); Naoto Tojo, Ikoma (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/066,500

(22) Filed: Feb. 28, 2005

(65) Prior Publication Data

US 2005/0212475 A1 Sep. 29, 2005

(30) Foreign Application Priority Data

Mar. 29, 2004 (JP) ............................. 2004-095107

(51) Int. Cl.
*H02P 7/68* (2006.01)
(52) U.S. Cl. .................... 318/567; 318/600; 318/625; 318/685
(58) Field of Classification Search ............... 318/439, 318/490, 282, 563, 538, 567, 600, 625, 685
See application file for complete search history.

(56) References Cited

U.S. PATENT DOCUMENTS

| | | | | |
|---|---|---|---|---|
| 5,038,088 A | * | 8/1991 | Arends et al. | 318/565 |
| 5,168,200 A | * | 12/1992 | Payne | 318/282 |
| 5,610,493 A | * | 3/1997 | Wieloch | 318/801 |
| 5,623,191 A | * | 4/1997 | Wieloch | 318/801 |
| 5,912,541 A | * | 6/1999 | Bigler et al. | 318/600 |
| 5,982,253 A | * | 11/1999 | Perrin et al. | 333/182 |
| 6,356,044 B1 | * | 3/2002 | Archer | 318/538 |
| 6,434,512 B1 | * | 8/2002 | Discenzo | 702/184 |
| 6,534,942 B2 | * | 3/2003 | Schmidhuber | 318/563 |
| 6,895,176 B2 | * | 5/2005 | Archer et al. | 388/825 |
| 2003/0126936 A1 | * | 7/2003 | Eggleton | 74/335 |
| 2004/0051496 A1 | * | 3/2004 | Archer et al. | 318/825 |
| 2004/0155619 A1 | * | 8/2004 | Hauselt et al. | 318/439 |
| 2004/0169423 A1 | * | 9/2004 | Ctvrtnicek et al. | 307/116 |
| 2004/0207354 A1 | * | 10/2004 | Kaplan et al. | 318/568.11 |
| 2005/0067991 A1 | * | 3/2005 | El-Ibiary | 318/490 |
| 2005/0267701 A1 | * | 12/2005 | McNutt | 702/73 |
| 2005/0273287 A1 | * | 12/2005 | McNutt | 702/73 |

FOREIGN PATENT DOCUMENTS

JP 4-123105 4/1992

(Continued)

*Primary Examiner*—Paul Ip
(74) *Attorney, Agent, or Firm*—McDermott Will & Emery LLP

(57) ABSTRACT

An actuator, which allows a controller to be commonly applied to a plurality of models without requiring complicated setting operation of control parameters, and is superior in cost effectiveness, reusability and expandability, is provided. And further, a motor unit and a controller unit constituting the actuator are provided. The motor unit is equipped with a motor, a motor drive circuit and a parameter memory, which stores characteristic parameters necessary for controlling the motor. A controller unit, which is adapted so as to be detachable to the motor unit, is provided with a motor control circuit and a communication control circuit. When the controller unit is attached to the motor unit, characteristic parameters stored in the parameter memory are loaded via a communication connector, and used for setting control parameters for the motor control circuit.

5 Claims, 11 Drawing Sheets

FOREIGN PATENT DOCUMENTS

| | | |
|---|---|---|
| JP | 5-252688 | 9/1993 |
| JP | 7-75364 | 3/1995 |
| JP | 2000-299970 | 10/2000 |
| JP | 2002-136057 | 5/2002 |
| JP | 2002-199771 | 7/2002 |
| JP | P 3332226 | 7/2002 |
| JP | P 3402597 | 2/2003 |
| JP | 2003-320836 | 11/2003 |

* cited by examiner (a) ROTATION IN CLOCKWISE (b) ROTATION IN COUNTER CLOCKWISE

FIG. 7

SPECIFICATION OF CONNECTOR

| 1 | VDD | POWER (DC5V OR 3.3V) |
|---|-----|----------------------|
| 2 | IREF | ANALOGUE CURRENT COMMAND VALUE |
| 3 | AGND | ANALOGUE GROUND |
| 4 | ENC-A | A-PHASE ENCODER SIGNAL (TTL) |
| 5 | ENC-B | B-PHASE ENCODER SIGNAL (TTL) |
| 6 | GND | GROUND |
| 7 | VDD | POWER SUPPLY FOR I2C BUS |
| 8 | SDA | DATA LINE I2C BUS |
| 9 | SCL | BUS CLOCK LINE I2C BUS |
| 10 | VSS | GROUND FOR I2C BUS |

FIG. 11

| MOTOR TYPE | Mt | 1 (BL MOTOR) |
|---|---|---|
| RATED OUTPUT | Ptyp | 20 (W) |
| RATED TORQUE | Ttyp | 382 (Nm×10$^{-4}$) |
| MAXIMUM TORQUE | Tmax | 540 (Nm×10$^{-4}$) |
| RATED REVOLUTION | Vtyp | 5000 (RPM) |
| MAXIMUM REVOLUTION | Vmax | 6500 (RPM) |
| TORQUE CONSTANT | Kt | 332 (Nm×10$^{-4}$/A) |
| RATED CURRENT | Ityp | 1150 (mA) |
| MAXIMUM CURRENT | Imax | 3450 (mA) |
| MOTOR INERTIA | Ja | 280 (gcm$^2$×10$^{-2}$) |
| ROTATIONAL POSITION DETECTOR | Renc | 500 (PPR) |
| ⋮ | ⋮ | ⋮ |

ACTUATOR, MOTOR UNIT AND CONTROLLER UNIT

CROSS-REFERENCE TO RELATED APPLICATIONS

This Nonprovisional application claims priority under 35 U.S.C. §119(a) on Patent Application No. 2004-95107 filed in Japan on Mar. 29, 2004, the entire contents of which are hereby incorporated by reference.

BACKGROUND OF THE INVENTION

The present invention relates to an actuator adapted to utilize revolution output of a motor such as AC servo motor to perform a predetermined operation, further relates to a motor unit and a controller unit constituting the actuator.

Conventionally, in a mechatronics equipment such as a robot or an NC machine tool, in order to cause each part to perform necessary operation, an actuator, which is adapted to use a motor such as AC servo motor as a drive source, has been used. Recently, as an actuator of this type, an actuator, which includes a motor as the drive source, a drive circuit (driver) for supplying the current to the motor, an operation circuit (controller) for operating current command value (included in control command) to be given to the drive circuit in a common housing; that is, an intelligent actuator has been in practical use. And after assembling the actuator to objective equipment, only by connecting the actuator to an external power supply or an external power supply and an upper controller, predetermined operation can be carried out (refer to, for example, Japanese Patent No. 3332226, Japanese Patent No. 3402597 and Japanese Patent Application Laid-Open No. 5-252688).

In the actuators used for mechatronics equipment as described above, the specifications (rated output, rated torque, rated revolution and the like) required for the motor as the drive source are different depending on the purpose. Therefore, a series of models of motors with various specifications is lined up as drive source, and an appropriate model is selected therefrom in accordance with the purpose.

The above-described intelligent actuators also, which include a driver and a controller along with a motor, have to be organized into a series. In this case, although the control algorithm for operating the control commands is common, controllers having different characteristic parameters used for calculation (rotor inertia, torque constant, torque-revolution characteristic and the like) of the actuator (motor) have to be prepared for each model. Further, it is difficult to cope with the changes in the control algorithm, there resides problems in the aspects of cost effectiveness, reusability and expandability.

To solve the above problems, it is possible to adopt a configuration in which a general-purpose controller externally provided to a motor, which is integrally equipped with a driver, is used. However, in this case, the respective characteristic parameters peculiar to the actuator have to be additionally set up to the employed controller. Not only that satisfactory improvement effect is not obtained, but also there is a possibility of causing an operation failure due to incorrect setting of parameters.

BRIEF SUMMARY OF THE INVENTION

The present invention has been proposed in view of the above problem. An object of the present invention is to provide an actuator, which allows a controller to be commonly applied to a plurality of models without requiring complicated setting operation of control parameters, and is superior in cost effectiveness, reusability and expandability; and further, to provide a motor unit and a controller unit constituting the actuator.

In order to achieve the above object, an actuator according to a first invention of the present invention is characterized in that an actuator, which performs a predetermined operation using a motor as a drive source, includes a motor unit having the motor, a drive circuit for the motor and a storage device storing characteristic parameters necessary for controlling the drive of the motor and an operation circuit for operating control commands to be given to the drive circuit, wherein a controller unit is detachably attached to the motor unit and in case that the controller unit is attached to the motor unit, a communication unit communicates among the arithmetic circuit, the drive circuit and the storage device so as to allow the signals to be transmitted and received thereamong are provided.

According to the present invention, the motor unit, which includes the motor and the drive circuit, and the controller unit, which has an operation circuit for operating the control commands to be given to the drive circuit, are provided separately. The motor unit includes a storage device for storing characteristic parameters necessary for controlling the drive of the motor. And when the controller unit is attached to the motor unit, the drive circuit and the storage device in the motor unit and the operation circuit in the controller unit are connected via a signal connector. And, first of all, characteristic parameters stored in the storage device are loaded to the operation circuit via a communication unit such as the signal connector. These characteristic parameters are used for setting control parameters for the operation circuit. After setting the control parameters, control commands calculated by the operation circuit are given to the drive circuit via the signal connector. Thus, the motor is driven by the operation of the drive circuit to perform a predetermined operation.

Also, the motor unit according to a second invention of the present invention is characterized in that the motor, the drive circuit for the motor and a storage device, which stores characteristic parameters necessary for controlling the drive of the motor, are provided therein.

According to the present invention, the motor unit includes the storage device for storing the characteristic parameters, which are necessary for controlling the drive of the motor, provided integrally with the motor and the drive circuit. The characteristic parameters stored in the storage device are given to the controller, which is separately constituted for controlling the motor. Thus, the calculation of the control commands within the controller is carried out without failure using the given characteristic parameters.

Further, the controller unit according to a third invention of the present invention is characterized in that an operation circuit, which is used being detachably attached to the motor unit according to the second invention to operate control commands to be given to the drive circuit, is provided.

According to the present invention, the operation circuit for the control commands to be given to the drive circuit of the motor is integrated into a unit so as to be detachably attached to the motor unit provided with the drive circuit and the storage device. When the controller unit is attached to the motor unit, characteristic parameters stored in the storage device is obtained to use for setting control parameters. Thus, the controller unit allows to be commonly used among a plurality of motor units.

According to the actuator in accordance with the first invention of the present invention, characteristic parameters for the motor as the drive source are loaded to the controller unit by means of transmission and reception of the signals carried out via communication unit. Accordingly, it is possible to automatically set up the control parameters for the operation circuit within the controller unit to the values peculiar to the attached motor unit. Thus, by applying the common operation circuit to other models, the cost effectiveness is improved. And by exchanging the controller unit, the actuator, which is superior in reusability and expandability, can be provided.

Also, according to the motor unit in accordance with the second invention, the storage device of the characteristic parameters for the motor is provided along with the motor and the drive circuit. Accordingly, it is possible to cause the operation circuit, which is constituted separately, to set up the values peculiar to the motor unit without failure and to perform the control operation.

According to the controller unit in accordance with the third invention, the operation circuit, which operates the control commands to be given to the motor via the drive circuit, is integrated into a unit, and is adapted to be detachably attached to the motor unit, which has the storage device for the characteristic parameters. Accordingly, the present invention provides excellent effects such that the controller unit can be commonly used among various kinds of motor units.

The above and further objects and features of the invention will more fully be apparent from the following detailed description with accompanying drawings.

BRIEF DESCRIPTION OF THE SEVERAL VIEWS OF THE DRAWINGS

FIG. 7 is a table of an example of the specifications of a signal connector;

FIG. 11 is a table showing an example of parameter data to be loaded.

DETAILED DESCRIPTION OF THE INVENTION

As described-above, an object of the present invention is to provide an actuator, which is capable of being commonly used with a plurality of models of controller without requiring a complicated setting operation of control parameters, and is superior in cost effectiveness, reusability and expandability. Further, an object of the present invention is to provide a motor unit and a controller unit constituting the actuator.

Figure 1:
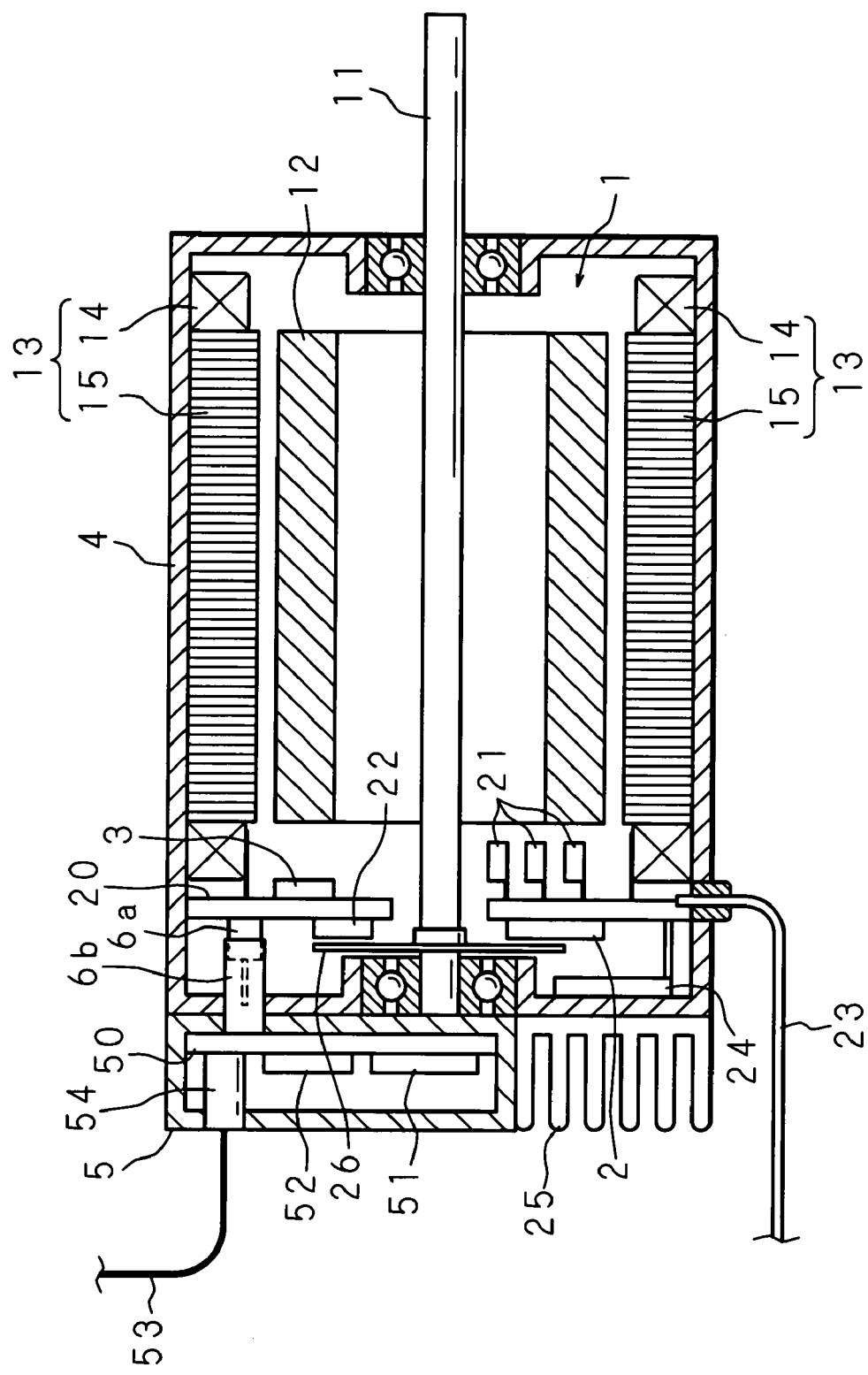
FIG. 1 is a vertical section of an actuator according to the present invention.
Figure 2:
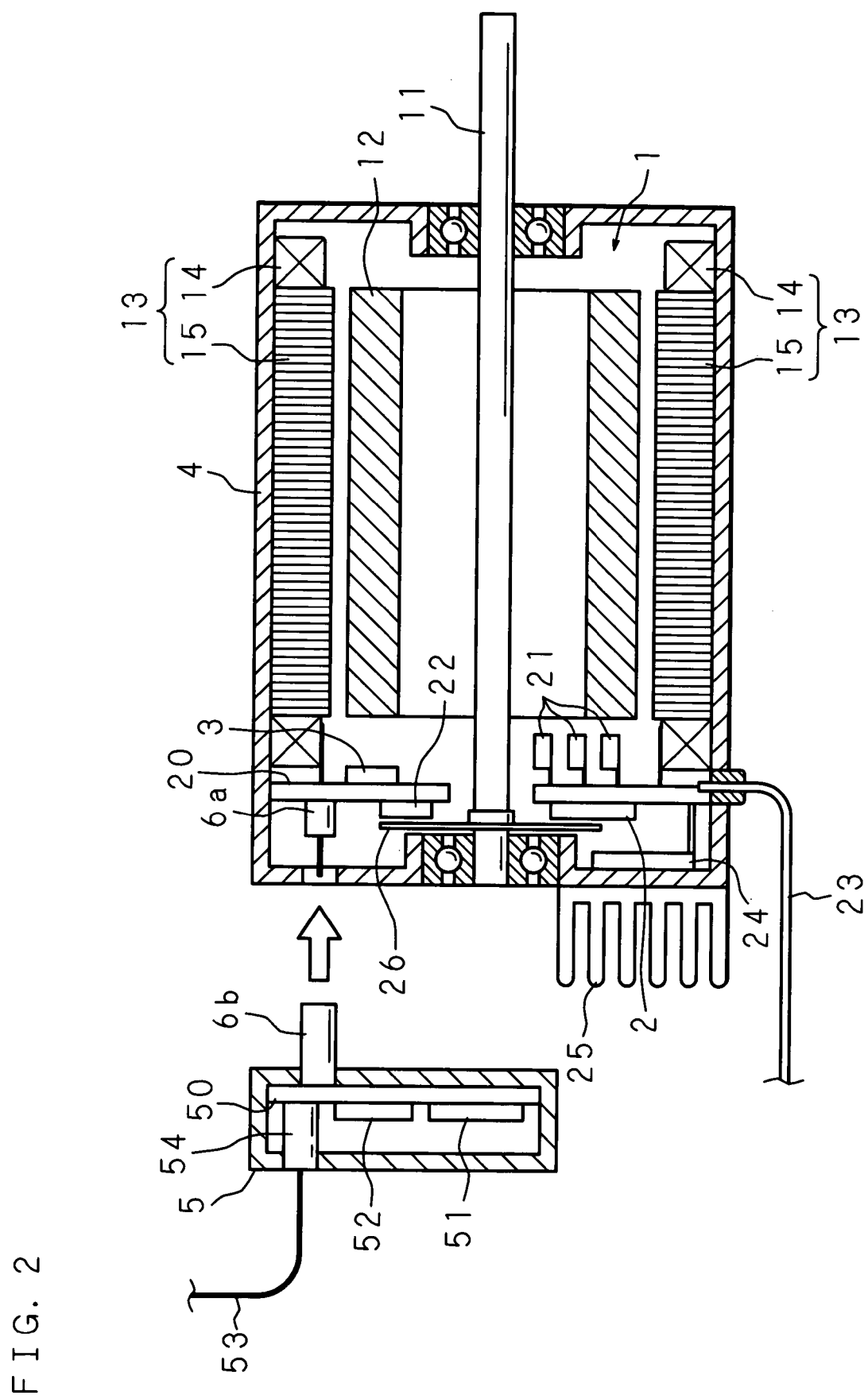
FIG. 2 is a vertical section of the actuator according to the present invention.

Hereinafter, the present invention will be described in detail with reference to the drawings showing embodiments thereof. FIG. 1 and FIG. 2 are vertical sections of an actuator according to the present invention. As shown in the FIGS. 1 and 2, the actuator comprises a motor 1 as a drive source, a motor drive circuit 2 that supplies drive current to the motor 1, a motor unit 4 according to the present invention which includes a parameter memory (storage device) 3 that stores characteristic parameters peculiar to the motor 1 within a cylindrical common housing and a controller unit 5 according to the present invention detachably attached to the exterior of the motor unit 4. FIG. 1 shows a state in which the controller unit 5 is mounted; and FIG. 2 shows a state in which the controller unit 5 is dismounted.

The motor 1 is an AC servo motor which includes, inside the housing of the motor unit 4, a motor shaft 11 which is supported so as to rotate coaxially via bearings on the both end walls, a rotor 12 which is fixed to the motor shaft 11 in the central area thereof so as to rotate integrally therewith and a stator 13 which is fixedly attached to the inner surface of the housing so as to enclose the outer side of the rotor 12. The motor 1 is arranged so that the revolution of the rotor 12, which is generated by supplying the power to the stator 13, is take out as revolution output to the shaft end portion of the motor shaft 11 protruding from one end wall of the housing to the outside.

It is possible to arrange so that, by means of a speed reduction device integrally coupled with the motor unit 4, the revolution of the motor shaft 11 is decelerated and taken out therefrom. Likewise, it is possible to arrange so that, by means of a motion-converting device integrally coupled with the motor unit 4, the revolution of the motor shaft 11 is converted into a motion other than revolution such as a linear motion and taken out therefrom. Needless to say, these arrangements are also included within a scope of the present invention.

Figure 3:
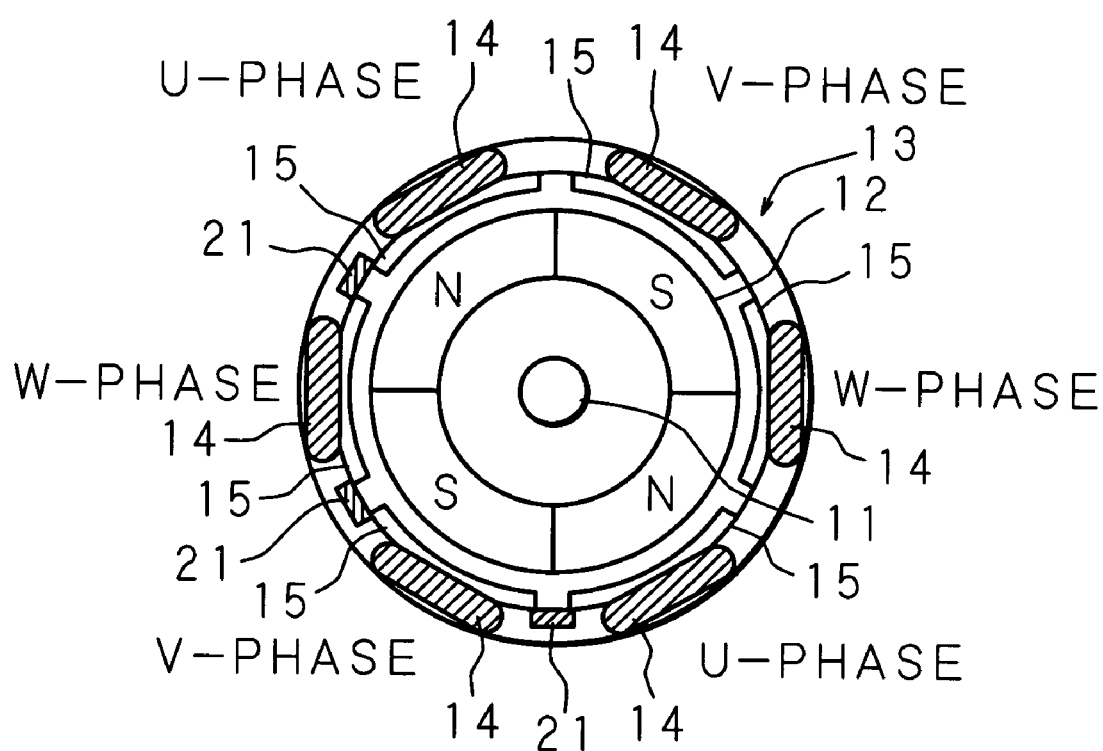
FIG. 3 is a cross section of a rotor and a stator.

FIG. 3 is a cross section of the rotor 12 and the stator 13. As shown in FIG. 3, the rotor 12 is a magneto constituted of 4 poles in which two each of N-poles and S-poles of the same size are alternately disposed in the periphery direction. The stator 13 is constituted of six stator cores 15, 15, . . . , on which a coil 14 is wound respectively, disposed in the periphery direction being interposed by the same intervals. Owing to this arrangement, when a current of U, V or W phase is supplied to the coils 14, 14, . . . of the stator 13 on the basis of relative position of the rotor 12 rotating therein, a running torque is generated on the rotor 12, and the running torque can be take out as the revolution output of the motor shaft 11.

The motor drive circuit 2 is fixedly provided inside the motor unit 4 facing to one side of the rotor 12 and the stator 13, being mounted on a drive board 20 of a doughnut-like disk having a through hole through which the motor shaft 11 can be inserted, and connect to an external power supply via a power cable 23. Also, on the drive board 20, three hole elements 21, 21, 21 for detecting rotational position of the rotor 12 are attached facing to the rotation area of the rotor 12, and a revolution detection circuit 22 and a parameter memory 3 are mounted thereon. And further, a signal connector 6a for connecting with the controller unit 5 is provided facing to an opening formed in the housing.

The motor drive circuit 2 is provided with a power element 24 such as power transistor or power FET as a device for supplying the power to the coils 14, 14, . . . . Since heat is generated during operation, the power element 24 is provided to the inner surface of the housing of the motor unit 4 opposite to the drive board 20. In a position corresponding to the position of the power element 24, heat-releasing fins 25 are fixedly formed on the outer surface of the housing so as to release the heat from the power element 24 to the outside.

As shown in FIG. 3, the hole elements 21, 21, 21 are disposed with a phase contrast of 60° from each other between three stator cores 15, 15, 15 neighboring each other constituting stator 13. Changes in output among the respective hole elements 21, 21, 21, which are caused by the four magnets constituting the rotor 12 passing by, are transmitted to the motor drive circuit 2 as signals indicating relative rotational position of the rotor 12 with respect to the stator 13, and are utilized for switching the supplied current to the coils 14, 14, . . . .

Figure 4:
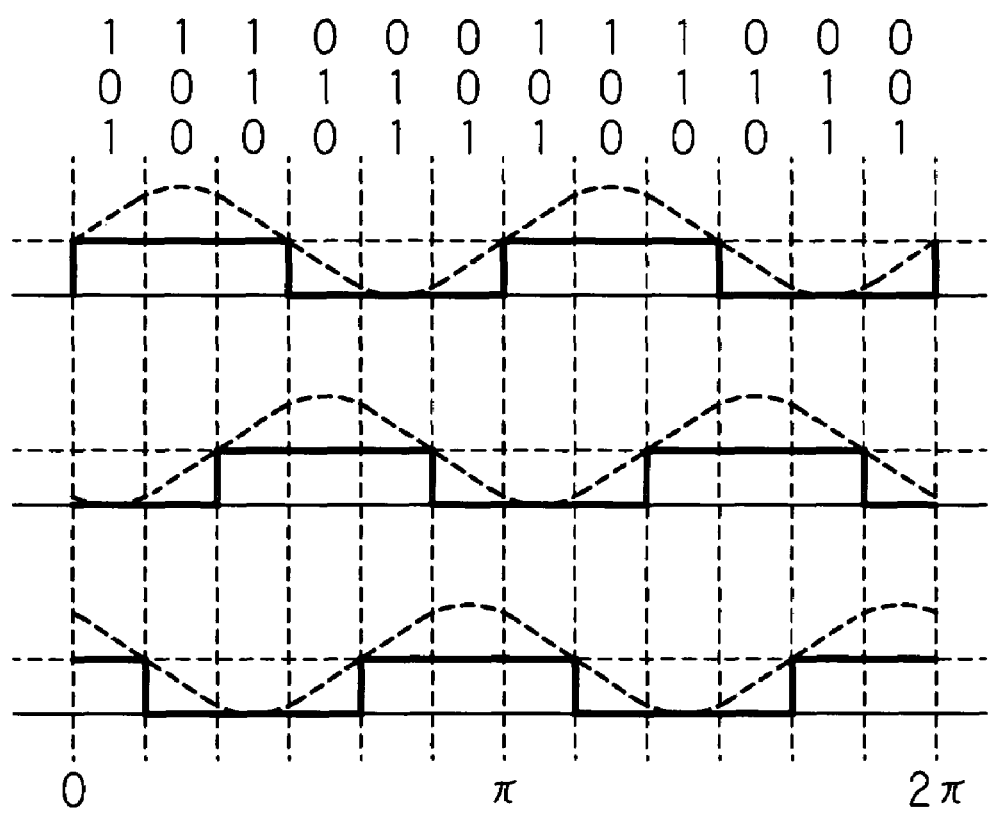
FIG. 4 is a diagram showing a relationship between the output from the hole elements and the supplied power to the coils.

FIG. 4 is a diagram showing the relationship between the output of the hole elements 21, 21, 21 and the supplied power of corresponding coils 14, 14, 14. The output of the hole elements 21, 21, 21, which are obtained as indicated with solid lines in FIG. 4, are encoded as shown in FIG. 4, corresponding to the combination thereof, and the supplied power to the coils 14, 14, 14 are switched as indicated with broken lines in FIG. 4.

Figure 5:
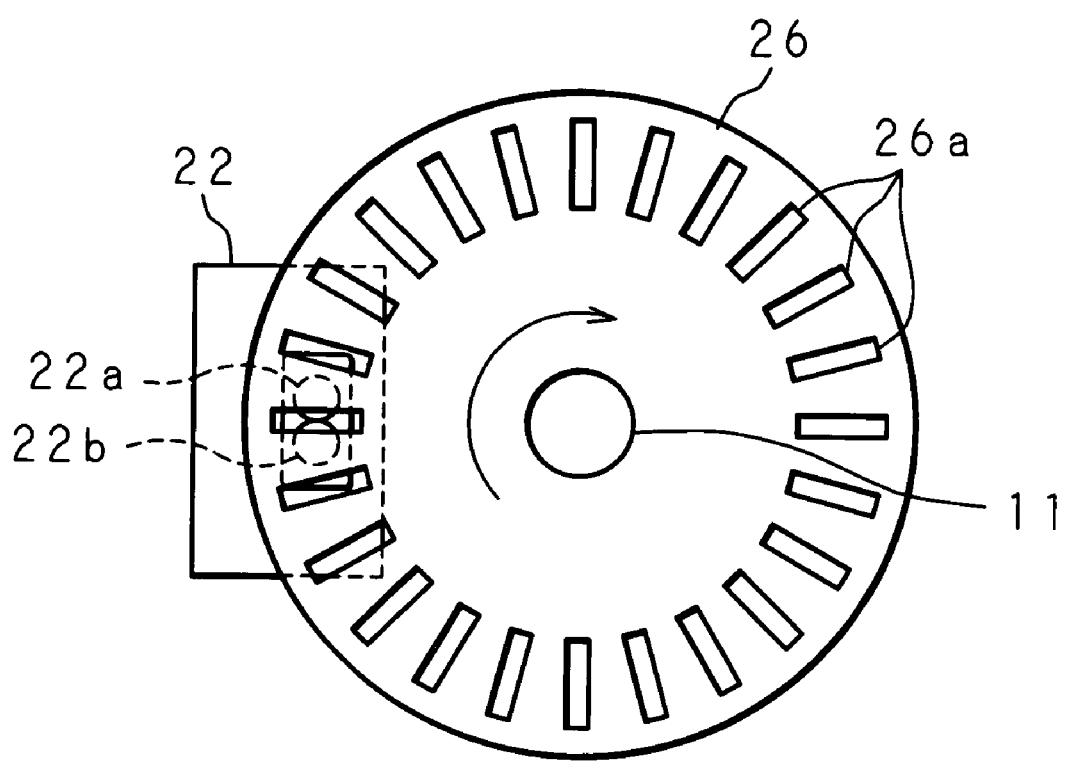
FIG. 5 illustrates the positional relationship between a slit disk and a revolution detection circuit.

The revolution detection circuit 22 is provided facing to a slit disk 26 fixedly attached to the motor shaft 11. FIG. 5 shows the positional relationship between the slit disk 26 and the revolution detection circuit 22. The slit disk 26, which turns along with the motor shaft 11, formed with a plurality of slit holes 26a, 26a, . . . , which are disposed at regular intervals in the periphery direction. The revolution detection circuit 22 is provided with two photo detectors 22a and 22b disposed on the rotational periphery of these slit holes 26a, 26a, . . . with a predetermined space therebetween.

Figure 6:
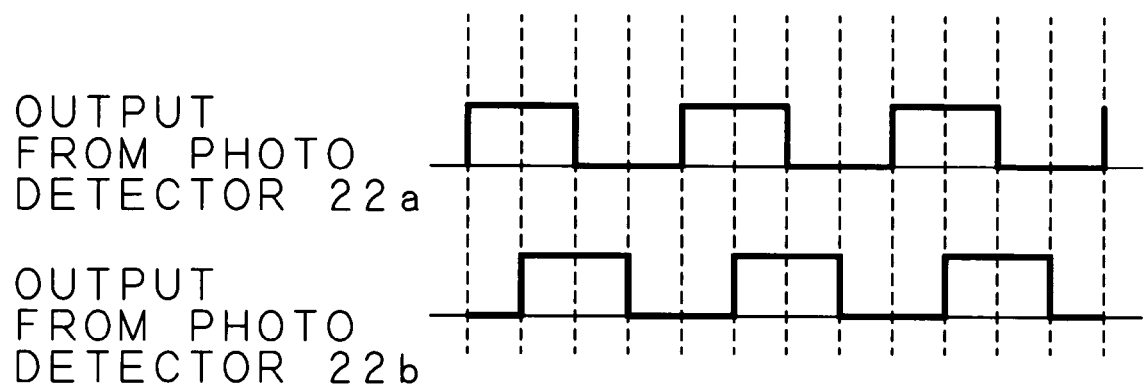
FIG. 6 shows an example of the output from a photo detector.
Figure 6:
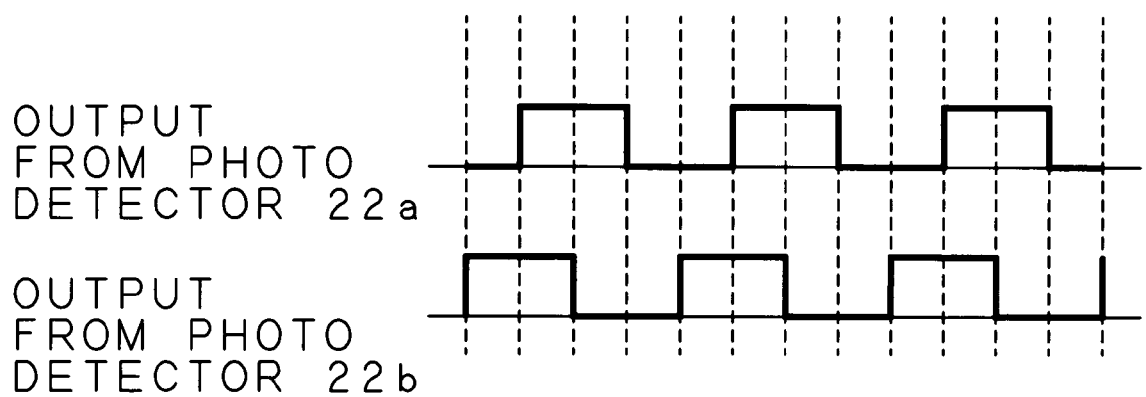

FIG. 6 shows an example of the output from the photo detectors 22a and 22b. The photo detectors 22a and 22b are positioned so as to output pulse signals having a predetermined phase contrast, which become high level when the slit holes 26a, 26a, . . . pass thereby. The revolution detection circuit 22 is adapted so as to output the output signals from the photo detectors 22a and 22b to the controller unit 5, which will be described later. The controller unit 5 determines clockwise/counter clockwise rotation of the motor shaft 11 on the basis of delay or advance of the output signals. Also, the revolution angle of the motor shaft 11 is obtained based on the count of number of pulses in the respective output signals. FIG. 6(a) shows an example of the output from the photo detectors 22a and 22b when the motor shaft 11 rotates in clockwise; FIG. 6(b) shows an example the output from the photo detectors 22a and 22b when the motor shaft 11 rotates in counter clockwise.

As a means for detecting the revolution angle of the motor shaft 11, a potentiometer, which is fixedly attached to the motor shaft 11 and the resistant value thereof changes corresponding to the revolution angle, may be used. Generally, in a potentiometer, fixed resistant values are allotted within predetermined measuring revolution angle (in the case of a potentiometer of a continuous revolution type, 360°); and the resistant value changes corresponding to the revolution angle therebetween. Accordingly, the potentiometer is generally provided with three terminals including two terminals for fixed resistant values and one terminal for variable resistance value. A revolution detection circuit equipped with a potentiometer imparts a specific voltage to the both end terminals of the fixed resistant value, and corresponding to the revolution, the variable resistance value changes; and thereby, the voltage value between the terminals accordingly changes. Using the correlation between the voltage value and the revolution angle, the revolution of the motor shaft 11 is controlled. When the signals are input to a controller or the like, analogue voltage values are converted into digital values using an A/D converter.

The parameter memory 3 is a nonvolatile memory in which proper characteristic parameters peculiar to the motor 1 necessary for controlling the same are stored. For example, a two-wired serial ROM using an I2C bus may be employed. The characteristic parameters include rated output, rated and maximum torque, and rated and maximum current of the motor 1, rotational inertia (motor inertia) of the motor 1 including the motor shaft 11 and the rotor 12, a torque constant representing the torque generated per unit current, and torque-revolution characteristic representing the relationship between generated torque and number of revolutions. Further, as a parameter necessary for obtaining rotational speed corresponding to the output from the revolution detection circuit 22, number of slit holes 26a, 26a, . . . formed in the slit disk 26 and the like are also included.

The controller unit 5 includes a motor control circuit 51 and a communication control circuit 52 mounted on a controller board 50 in a plate-like casing. Also, on the controller board 51, a cable connector 54 is provided. And further, a signal connector 6b, which is coupled with the signal connector 6a on the drive board 20, is formed protruding to the outside. As indicated with an outlined arrow in FIG. 2, by plugging the signal connector 6b into the opening formed in the housing of the motor unit 4 to connect the same to the signal connector 6a on the drive board 20, the controller unit 5 is used being attached to the motor unit 4 along the exterior thereof as show in FIG. 1. Here, the cable connector 54 is connected unshown upper controller via a serial bus cable 53.

The motor control circuit 51, which will be described later, is an operation circuit that operates current command values to be given to the motor drive circuit 2. The operation is carried out by using the above-described characteristic parameters given from the parameter memory 3 via the signal connectors 6a and 6b and encoder signals given from the revolution detection circuit 22. The current command values obtained by the operation are given to the motor drive circuit 2 via the signal connectors 6a and 6b.

The communication control circuit 52 receives an actuator operation command given from the upper controller via the serial bus cable 53 and carries out an operation to output a motor control command to the motor control circuit 51. The calculation of the current command value in the motor control circuit 51 is carried out in accordance with the motor control command given from the communication control circuit 52. The power is also supplied to the motor control circuit 51 and the communication control circuit 52 via the signal connectors 6a and 6b. FIG. 7 is a table showing an example of the specifications of the signal connectors 6a and 6b.

Figure 8:
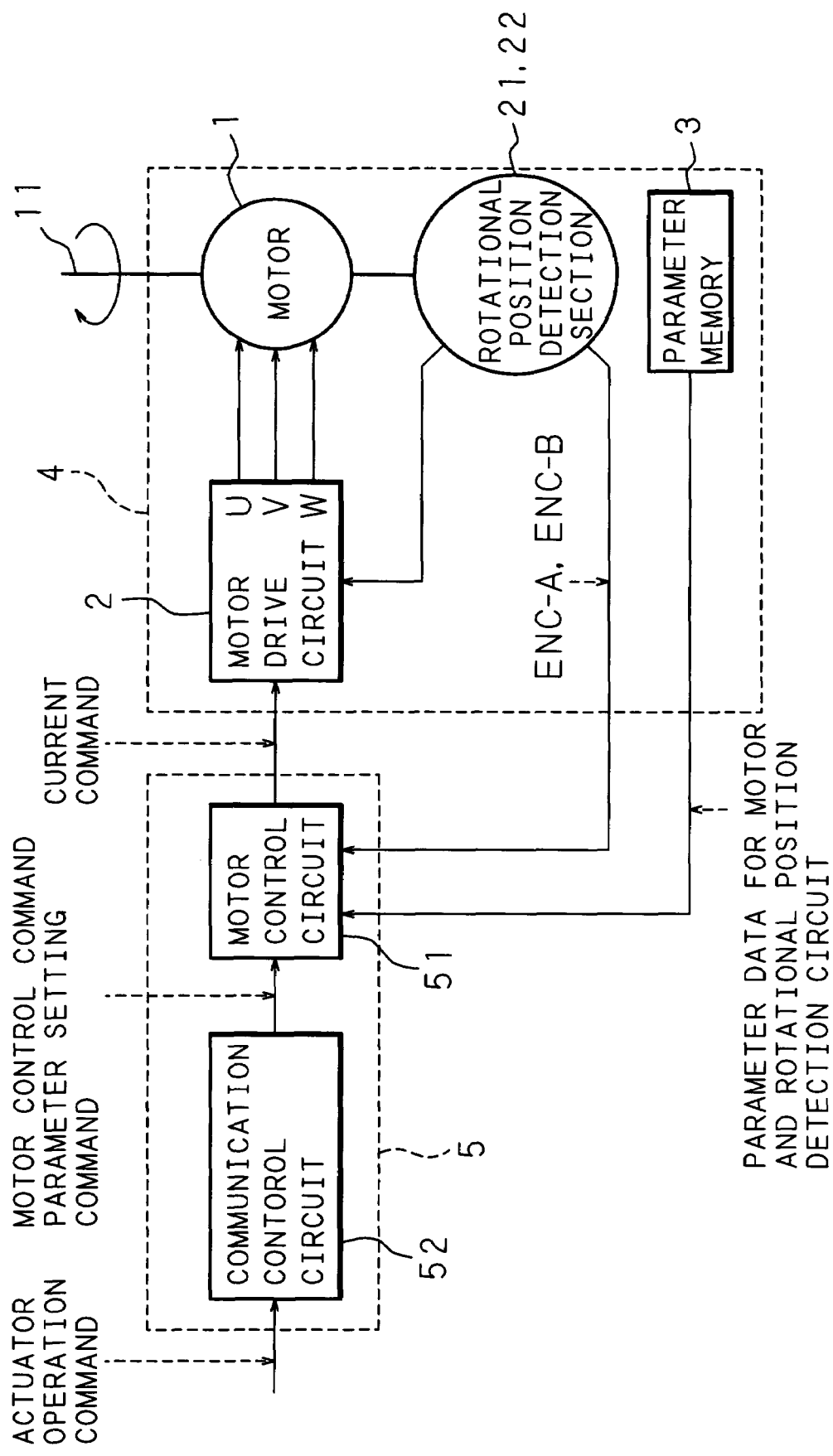
FIG. 8 is a block diagram showing a configuration of a control system of the actuator according to the present invention.

FIG. 8 is a block diagram showing a configuration of a control system of the actuator according to the present invention. The actuator operation command given to the controller unit 5 from the upper controller is, as described above, input as a serial data signal to the communication control circuit 52 via the serial bus cable 53. As for the serial bus, a USB (Universal Serial Bus) 2.0 may be employed. The communication control circuit 52 carries out a signal processing in accordance with the protocol of the bus, and creates a motor control command or a parameter setting command to output the command to the motor control circuit 51.

To the motor control circuit 51, a motor control command or a parameter setting command is input from the communication control circuit 52, and via the signal connectors 6a and 6b, an encoder signal from the rotational position detection circuit 22 in the motor unit 4 is given, and from the parameter memory 3, the characteristic parameters of the motor 1 and a parameter data with respect to the rotational position detection circuit 22 are given. The motor control circuit 51 recognizes the rotational status of the motor 1 by processing the encoder signals, calculates a current command value on the basis of an error between the recognition result and the motor control command, and outputs the current command value to the motor drive circuit 2 via the signal connectors 6a and 6b.

Being given with the outputs from the hole elements 21, 21 and 21, the motor drive circuit 2 recognizes the position of the magneto on the rotor 12 on the basis of the above-described code processing of these outputs, and supply the power to each of the U, V and W phases of the stator 13 on the motor 1 so as to generate a running torque in the direction indicated by the current command value. At this time, the current value is appropriately controlled by means of feedback control (proportional control, proportional integral control etc) on the basis of a deviation between the current value, which actually flows through the coils 14, 14, . . . and the current command value. The rotational position detection section in FIG. 8 includes both of the revolution detection circuit 22 and the hole elements 21, 21 and 21.

Figure 9:
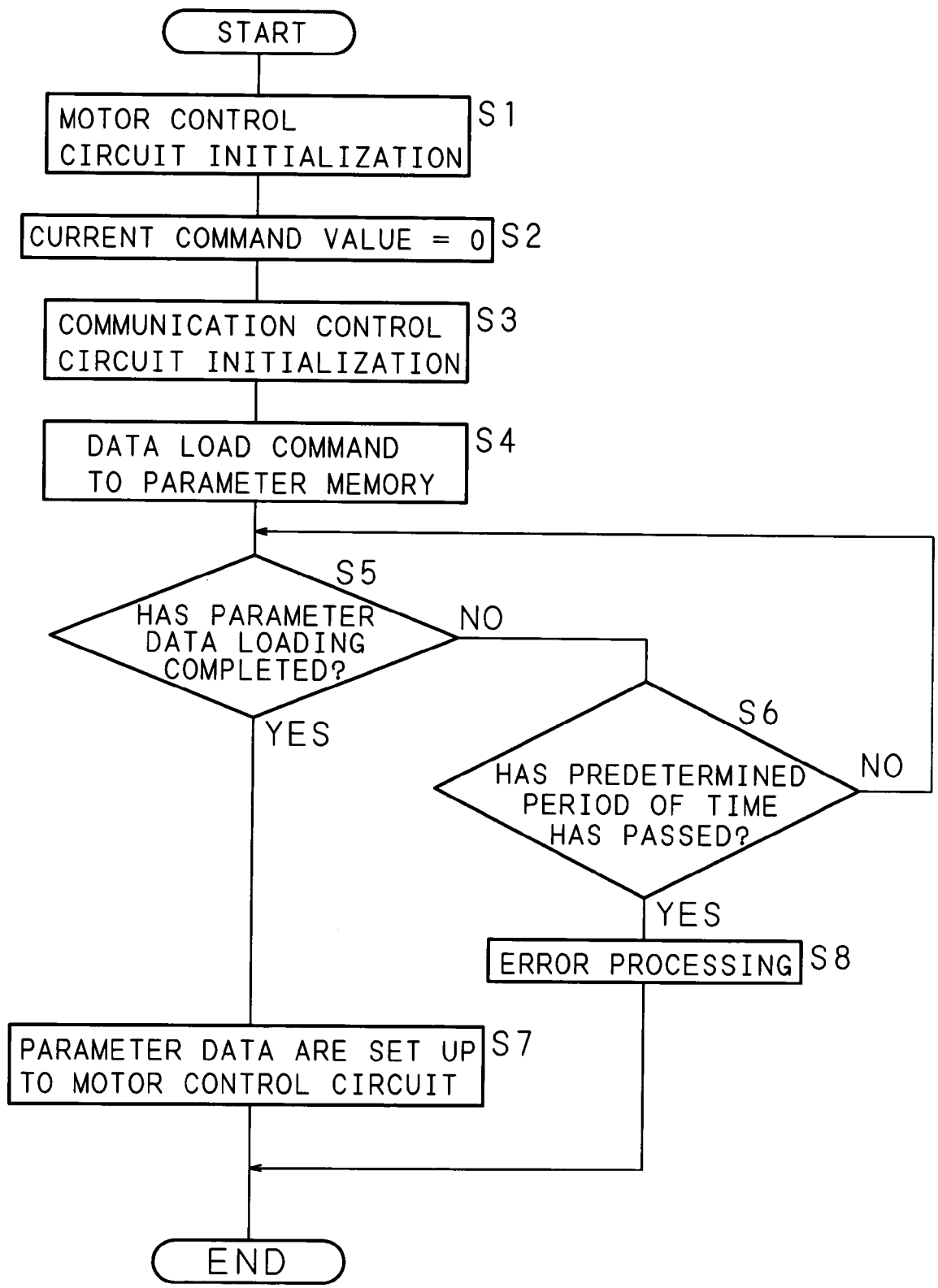
FIG. 9 is a flowchart showing a loading sequence of parameter data.

In the control operation carried out as described above, the motor control circuit 51 uses the parameter data given from the parameter memory 3. When the controller unit 5 is attached to the motor unit 4 as described above, the parameter data are loaded to the motor control circuit 51 via the signal connectors 6a and 6b. FIG. 9 is a flowchart showing the loading sequence of the parameter data.

By attaching the controller unit 5 to the motor unit 4 as described above, the power is supplied to the controller unit 5 via the signal connectors 6a and 6b. When the power is supplied as described above, the flow shown in FIG. 9 starts. First of all, the motor control circuit 51 is initialized (step 1), and then, the current command value is set to zero (step 2).

Then, the communication control circuit 52 is initialized (step 3); thus, a state, in which the communication with the upper controller via the serial bus cable 53 is possible, is established. After completing the above initialization processing, a data load command is transmitted to a parameter memory 3 via the signal connectors 6a and 6b (step 4), and in accordance with the command, the above-described parameter data given from the parameter memory 3 are loaded.

After that, it is determined whether or not every parameter data have been loaded (step 5), and then, it is determined whether or not a predetermined period of time necessary for loading the data has passed (step 6). When the loading has completed until the predetermined period of time has passed, the process proceeds to step 7 to set up the control parameters on each of the control blocks of the motor control circuit 51 on the basis of the parameter data, and the load flow is terminated. Also, when the loading has not been completed until the predetermined period of time has passed, the process proceeds to step 8 and it is determined that some error has occurred on the parameter memory 3 or the controller unit 5 at the motor 1 side, and after carrying out a predetermined error processing, the load flow is terminated. As for the error processing, if the actuator is prevented from operating by using, for example, an inappropriate control parameter such as prohibition of operation of the controller unit 5, any method may be employed.

Figure 10:
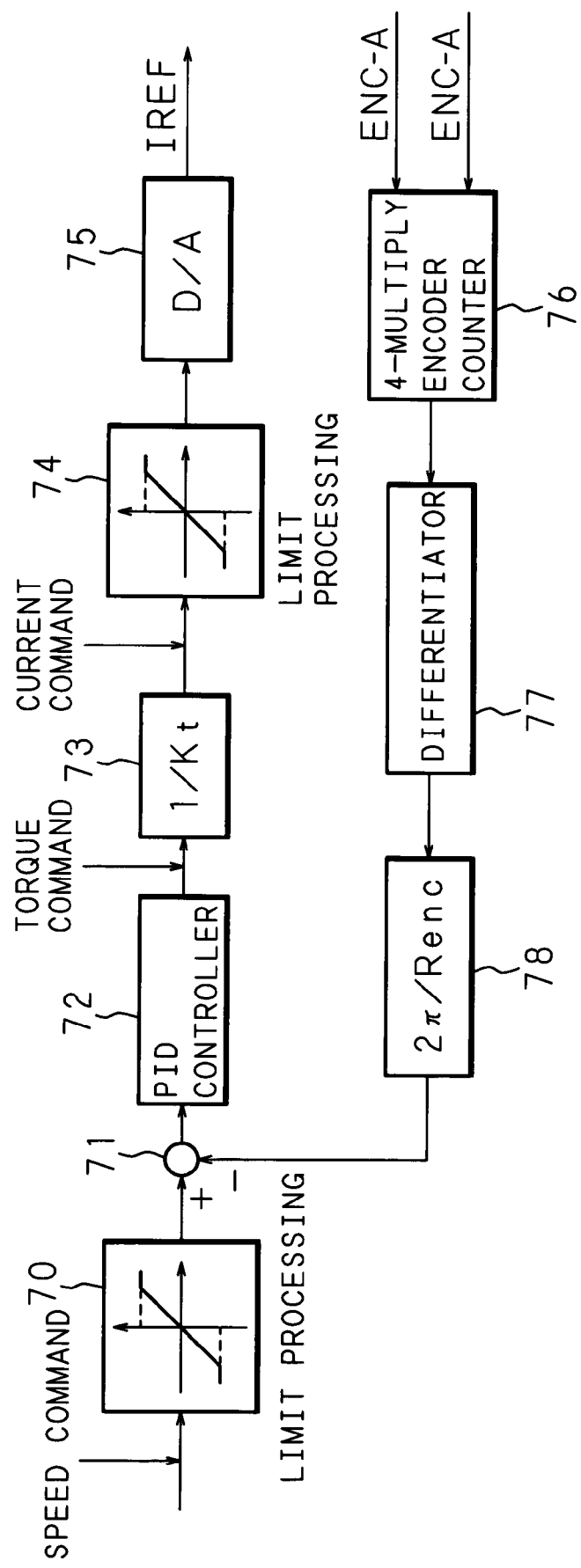
FIG. 10 is a block diagram showing an example of a configuration of a motor control circuit.

FIG. 10 is a block diagram showing an example of a configuration of the motor control circuit 51 by which the rotational speed of the motor 1 can be controlled. FIG. 11 is a table showing an example of parameter data to be loaded.

In the motor control circuit 51 shown in FIG. 10, the speed command included in the motor control command are subjected to a limit processing by a speed limiter 70, and then given to an adder 71. To this adder 71, detected signals of rotational speed of the motor 1, which are obtained by processing the encoder signals from the revolution detection circuit 22 through a 4-multiply encoder counter 76 and a differentiator 77 and multiplied by a predetermined gain with a multiplier 78, are given. The output from the adder 71, which is output as a deviation between the speed command and the detected speed, is converted into a torque command through a PID operation section 72, and is multiplied by a predetermined gain with a multiplier 73 into a current command, and after being subject to a limit process by the current limiter 74, output as a current command value through a D/A converter 75, and given to the motor drive circuit 2.

In the motor control circuit 51 configured as described above, in the parameter data shown in FIG. 11, for example, maximum number of rotation N max and maximum current max are used for setting limit values of the speed limiter 70 and the current limiter 74. Torque constant Kt is used for gain setting of the multiplier 73. Parameter data R ena of the revolution detection circuit 22 is used for gain setting of the multiplier 78. And further, motor inertia Ja is used for gain setting in the PID controller 72.

As described above, in the actuator according to the present invention, the motor unit 4, which includes a motor 1 as the drive source, the motor drive circuit 2 for supplying drive current to the motor 1 and a parameter memory 3 stored with characteristic parameters necessary for controlling the motor 1 is detachably attached to the controller unit 5 so that the signals can be transmitted and received between the motor drive circuit 2 and the parameter memory 3 via the signal connectors 6a and 6b. A dedicated controller unit 5 can be obtained by setting the characteristic parameters, which are loaded from the parameter memory 3, using the common controller unit 5 with the motor unit 4 equipped with the motor 1 having different specifications as the drive source. Accordingly, in addition to economical superiority, since the controller unit 5 can be exchanged in accordance with the requirements, the superiority in the reusability and the expandability is also obtained.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A motor-driving actuator, comprising:
   a motor unit including a drive circuit for driving a motor,
   a storage device storing characteristic parameters necessary for controlling the drive of said motor;
   a controller unit including an arithmetic circuit for generating control commands to be transmitted to said drive circuit, said controller unit detachably connected to said motor unit, and
   a communication unit for communicably coupling said motor unit and said controller unit; wherein the communication unit, when the controller unit is attached to the motor unit, communicates among said arithmetic circuit, said drive circuit and said storage device to allow signals to be transmitted and received thereamong.

2. The actuator according to claim 1, wherein, when a loading of characteristic parameters stored in the storage device to a memory is not completed within a predetermined period of time, the operation of said controller unit is prohibited.

3. The actuator according to claim 1, wherein the characteristic parameters include rated output, rated and maximum torque, rated and maximum current, rotational inertia, torque constant, and torque-revolution characteristics, or number of slit holes with respect to said motor.

4. The actuator according to claim 2, wherein the characteristic parameters include rated output, rated and maximum current, rotational inertia, torque constant, and torque-revolution characteristics, or number of slit holes with respect to said motor.

5. A motor unit, comprising a motor, a drive circuit of the motor and a storage device, wherein:

the motor, drive circuit and storage device are integrated within the motor unit and the motor drive is responsive to an external controller; and the storage device stores characteristic parameters necessary for controlling the drive of said motor; wherein the motor unit is detachably coupled to a control unit, the control unit comprising an arithmetic circuit that calculates control unit commands to be transmitted to said drive circuit.

* * * * *